United States Patent
Yasumura et al.

(10) Patent No.: US 6,353,036 B1
(45) Date of Patent: Mar. 5, 2002

(54) PROCESS FOR PRODUCING UNSATURATED POLYESTER AND UNSATURATED POLYESTER RESIN COMPOSITION

(75) Inventors: Takashi Yasumura; Chikara Yoshioka, both of Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/628,017

(22) Filed: Jul. 28, 2000

(30) Foreign Application Priority Data

Jul. 28, 1999 (JP) .......................................... 11-213543

(51) Int. Cl.$^7$ ........................... C08J 11/24; C08G 63/46
(52) U.S. Cl. ........................ 521/48.5; 521/48; 525/44; 528/307; 528/308.3
(58) Field of Search .................... 521/48.5, 48; 525/44; 528/307, 308.3

(56) References Cited

U.S. PATENT DOCUMENTS 5,380,793 A    1/1995   Pepper

*Primary Examiner*—Tae H.. Yoon
(74) *Attorney, Agent, or Firm*—Armstrong, Westerman & Hattori, LLP

(57) ABSTRACT

A process for producing an unsaturated polyester comprising the steps of (1) (A)depolymerizing polyethylene terephthalate with a polyhydric alcohol, (B) adding maleic anhydride to the depolymerization product to allow them to react with each other, and (C) adding dicyclopentadiene to the reaction mixture to cause addition reaction and (2) adding a polyhydric alcohol and a polybasic acid to the reaction product obtained in step (1) to cause polycondensation reaction is disclosed. An unsaturated polyester resin composition comprising the unsaturated polyester and a polymerizable unsaturated monomer, and a molding compound comprising the unsaturated polyester resin composition are also disclosed.

5 Claims, No Drawings

PROCESS FOR PRODUCING UNSATURATED POLYESTER AND UNSATURATED POLYESTER RESIN COMPOSITION

FIELD OF THE INVENTION

This invention relates to a process for producing an unsaturated polyester from polyethylene terephthalate (hereinafter abbreviated as PET), particularly waste (or scrap) PET, and an unsaturated polyester resin composition and a molding compound comprising the resulting unsaturated polyester.

BACKGROUND OF THE INVENTION

It is known that waste PET, whether post-consumer or non-post-consumer, can be recycled by depolymerization in a glycol, followed by reaction with an unsaturated polybasic acid and a glycol to produce an unsaturated polyester. This technique has recently been re-studied as disclosed in JP-A-11-60707, JP-A-8-151438, and JP-A-11-181067.

However, the unsaturated polyester obtained from waste PET has poor compatibility with unsaturated monomers such as styrene, and its solution has poor solubility stability with time. This seems attributable to the crystallinity originated in the PET segments and the intermolecular hydrogen bond strength of the ester moiety between ethylene glycol originated in PET and fumaric acid. A combined use of various glycols has been a generally followed practice to improve the compatibility as taught in JP-A-8-151438. The chief aim of the combined use of a plurality of glycols is improvement on compatibility with unsaturated monomers such as styrene. Studies taking into consideration the quality or performance of molded articles obtained from the resulting resin composition have not been made to date.

Sheet molding compounds (SMC), bulk molding compounds (BMC), etc. comprising the unsaturated polyester should contain a thermoplastic resin as a low profile additive. A polystyrene resin is of frequent use as a low profile additive for its water resistance and inexpensiveness. As stated above, the conventional unsaturated polyester prepared from waste PET has poor compatibility with the low profile additive or poor uniformity retention in a mixed state with the low profile additive so that they are liable to separate from each other during a thickening step or storage of molding compounds comprising the unsaturated polyester. Molded articles obtained from such a molding material are inferior in appearance and quality to those obtained from a molding material comprising an ordinarily produced unsaturated polyester.

SUMMARY OF THE INVENTION

An object of the present invention is to eliminate the drawbacks of molded articles of a polyester resin composition obtained from PET, i.e., to improve compatibility of the polyester resin with a low profile additive and to improve appearance and quality of the molded article.

In order to increase usefulness of the unsaturated polyester prepared out of PET, the present inventors have conducted extensive investigation and reached the present invention as a result.

The present invention provides a process for producing an unsaturated polyester comprising the steps of (1) (A) depolymerizing polyethylene terephthalate with a polyhydric alcohol, (B) adding maleic anhydride to the depolymerization product to allow them to react with each other, and (C) adding dicyclopentadiene to a carboxyl group derived from the maleic anhydride to cause addition reaction and (2) adding a polyhydric alcohol and/or a polybasic acid to the reaction product obtained in step (1) to cause polycondensation reaction.

Further, in the above process of the present invention, if strict control of the addition rate of the dicyclopentadiene to the carboxylic group of the maleic anhydride in step (C) is carried out, an unsaturated polyester having very stable quality can be obtained.

The invention further provides an unsaturated polyester resin composition comprising the unsaturated polyester obtained by the above process and a polymerizable unsaturated monomer.

The invention furthermore provides a molding compound comprising the unsaturated polyester resin composition.

DETAILED DESCRIPTION OF THE INVENTION

The PET which can be used as a starting material in step (A) is a polymer synthesized essentially from terephthalic acid and ethylene glycol and includes the waste generated in PET production, recycled PET of various waste PET molded articles, and regrinds of waste PET generated in production of PET molded articles. Typical are regrinds, called waste PET or regenerated polyester, obtained by physically and mechanically grinding PET bottles into chips, powder, pellets or flakes, which preferably have an average particle size of 1 to 10 mm.

The term "polyethylene terephthalate (PET)" as used herein includes not only polymers consisting of terephthalic acid and ethylene glycol but those further comprising other units of cyclohexanedimethanol, isophthalic acid, naphthalenedicarboxylic acid, etc. as a modifying comonomer.

PET does not always need to be transparent. Colored (e.g., green-colored) or printed PET is also useful unless the resulting molding article is not limited in hue, etc.

The maleic anhydride which can be added in step (B) is a compound obtained by heat dehydration of maleic acid or catalytic oxidation of benzene with air. Commercially available maleic anhydride, preferably of such a grade as has a purity of 95% or more and high resistance to thermal coloration can be used.

The dicyclopentadiene (hereinafter abbreviated as DCPD) which can be used in step (C) does not need to have high purity, and commercially available products can be employed. It is preferred to use DCPD which is composed of components that do not form a large amount of gel (heat crosslinking product) during polycondensation and has a purity of 85% or higher.

The polyhydric alcohol with which PET is depolymerized in step (A) is not particularly limited and is appropriately selected according to the purpose. It is desirable to use such a polyhydric alcohol as depolymerizes PET when added in a small amount and completes the depolymerization smoothly and rapidly at a relatively low temperature of 260° C. or lower.

Polyhydric alcohols of which two hydroxyl groups have a primary structure are preferred from the standpoint of rapid depolymerization. Such polyhydric alcohols include neopentyl glycol, 2-methyl-1,3-propanediol, and 3-methyl-1,5pentanediol. The polyhydric alcohol for PET depolymerization is selected appropriately depending on the molecular design, and the performance required, of the unsaturated polyester. If desired two or more kinds of polyhydric alcohols can be used in combination. A preferred weight ratio of the polyhydric alcohol to PET ranges from 30:37 to 90:10.

The PET depolymerization with the polyhydric alcohol is preferably carried out in a relatively low temperature ranging from 200 to 260° C. Desirably, a catalyst is used to accelerate the depolymerization. Suitable catalysts include organic acid salts, alkoxides or chelates of metals. It is desirable to decide the kind and the amount of the catalyst so as not to impair the physical properties of the resin. From this viewpoint, a preferred catalyst is a tin compound, particularly a monobutyltin compound, and a preferred amount of the catalyst is from 0.01 to 1.0% by weight based on the total weight of the polyhydric alcohol and PET.

The resulting PET depolymerization product is a mixture of ethylene terephthalate oligomers having ethylene glycol or the glycol used in step (A) at the end thereof, which further comprises glycol diterephthalate, free glycols, such as the glycol used in step (A) and ethylene glycol, and the like.

After step (A), the PET depolymerization product (mixture) is preferably cooled to 150° C. or lower. In step (B), a requisite amount of maleic anhydride is added to the mixture and allowed to react with the depolymerization product. In step (C), DCPD is added to the reaction mixture to undergo addition reaction with a carboxyl group of the maleic anhydride. The order of steps (B) and (C) is not particularly limited. The stage of adding DCPD can be decided according to the production equipment. As far as exotherm is controllable, DCPD may be added either before or after, or simultaneously with the addition of maleic anhydride. In a preferred embodiment, addition of maleic anhydride (step (B)) precedes addition of DCPD (step (C)) from the standpoint of reaction controllability.

Maleic anhydride is preferably added in an amount of 40 to 100% by weight based on the PET depolymerization product.

DCPD is preferably added in an amount of 20 to 50% by weight based on the PET depolymerization product. The addition reaction of DCPD is preferably carried out in a temperature range of from 120 to 150° C., in which DCPD is prevented from degradation into cyclopentadiene (CPD), etc., thereby securing a desired structure of the resin. It should be understood that the reaction temperature is by no means limited to the above range. That is, in cases where Diels-Alder reaction of CPD with maleic acid to produce nadic acid (i.e., norbornenedicarboxylic acid) is desired for the performance of the resulting unsaturated polyester resin, the addition reaction of DCPD can be conducted at temperatures exceeding 150° C.

In order to achieve the addition reaction of DCPD with the carboxyl group of the maleic acid, setting of the acid value of the final reaction product of step (1) is of importance. Specifically, the theoretical acid value at the time when the added DCPD is 100% added to the maleic acid is calculated from their respective charged amounts, and the thus calculated value is determined as a design acid value. In order to complete the addition of DCPD to the maleic acid smoothly, the design acid value is preferably 100 mgKOH/g or more. More preferably, it is desirable to obtain the reaction product after the completion of step (1) having the acid value of from 140 to 300 mgKOH/g. Further, the molar ratio of dicyclopentadiene in step (C) to maleic anhydride in step (B) of the present invention is preferably from 0.15:1 to 0.5:1.

In the present invention, controlling of the addition rate of DCPD to the carboxyl group of the maleic acid is also of importance. As the method of tracing the addition rate, a method which comprises measuring the acid value of the reaction product in step (C), comparing the value with a design acid value, and examining the reduced amount of the acid value is easy and preferable.

For the purpose of controlling the degree of ring opening of the maleic anhydride and increasing the final theoretical acid value, a polyhydric alcohol or a small amount of water may be added to the reaction system immediately before the ring-opening reaction. If water is added, it is desirable to use water in a molar ratio of water to the maleic anhydride of from 0.01:1 to 0.5:1 from the standpoint of the resin properties. If the water is used within the above range, production of maleic acid diester compounds of DCPD can be inhibited. Further, the production example using this technique falls within the scope of the invention.

Addition reaction of DCPD is conducted until the acid value is reduced to a prescribed level to complete step (C), which means the end of step (1). As described above, the degree of addition of DCPD can be traced by examining the reduced amount of the acid value. A preferred degree of addition reaction is 90 mol % or more.

In step (2) prescribed amounts of a polyhydric alcohol and/or a polybasic acid are added to the reaction mixture. After the reaction atmosphere is sufficiently displaced with an inert gas, such as nitrogen, the temperature is raised to cause dehydration and polycondensation. The reaction is preferably performed at 180 to 220° C. until the acid value is reduced to a desired value, particularly 20 to 40 mgKOH/g. There is thus produced an unsaturated polyester.

The polyhydric alcohol which can be used in steps (1) and (2) typically include dihydric alcohols, such as ethylene glycol, propylene glycol, 1,3-propanediol, 2-methyl-1,3-propanediol, 1,2-butanediol, 1,3-butanediol, neopentyl glycol, 2,2-diethyl-1,3-propanediol, 2-butyl-2-ethyl-1,3-propanediol, 2,2 4-trimethyl-1,3-pentanediol, 3-methyl-1,5-pentanediol, 1,6-hexanediol, 1,4-cyclohexanedimethanol, diethylene glycol, dipropylene glycol, hydrogenated bisphenol A, an alkylene oxide adduct of hydrogenated bisphenol A, hydrogenated hydroquinone, and an alkylene oxide adduct of bisphenol A; and tri functional or more functional polyhydric alcohols, such as glycerol and trimethylolpropane. These polyhydric alcohols can be used either individually or as a combination thereof. The polyhydric alcohols to be used are selected appropriately according to the desired performance. If desired, a monohydric alcohol, such as benzyl alcohol, can be used in combination for viscosity adjustment. In step (2) the polyhydric alcohol is preferably added in an amount of 30% by weight or less based on the reaction product of step (1). A greater amount is sometimes added depending on the prescribed percent excess of polyhydric alcohol.

The polybasic acids which can be used in step (2) typically include unsaturated polybasic acids, such as maleic acid, maleic anhydride, fumaric acid, and itaconic acid; aliphatic saturated polybasic acids, such as malonic acid, succinic acid, adipic acid, azelaic acid, and sebacic acid; aromatic saturated polybasic acids, such as phthalic anhydride, isophthalic acid, terephthalic acid, trimellitic acid, and 2,6-naphthalenedicarboxylic acid; and alicyclic saturated polybasic acids, such as tetrahydrophthalic anhydride, 1,2-hexahydrophthalic anhydride, 1,4-cyclohexanedicarboxylic acid, and nadic acid. These polybasic acids can be selected appropriately according to the desired performance either individually or as a combination thereof. The polybasic acid is preferably added in an amount of 30% by weight or less based on the reaction product of step (1). If necessary, monofunctional acids, such as benzoic acid and 4-t-butylbenzoic acid, may be added for viscosity adjustment.

The resulting unsaturated polyester is dissolved in a radical polymerizable unsaturated monomer in a usual manner to provide a liquid unsaturated polyester resin composition. The radical polymerizable unsaturated monomers include, but are not limited to, styrenes, acrylic esters, methacrylic esters, and diallyl phthalate. Suitable unsaturated monomers are selected according to the use and desired performance of the unsaturated polyester resin composition.

According to the process of the invention, an unsaturated polyester with stable performance can always be produced on a large scale without requiring expensive hydroxylated DCPD nor involving a complicated step of adding a separately prepared compound such as a DCPD maleic acid monoester.

The process of producing the unsaturated polyester and the composition thereof according to the present invention can be carried out sufficiently with conventional equipment for unsaturated polyester resin production.

The unsaturated polyester resin composition of the present invention is compounded with a low profile additive, a filler, a reinforcement, a curing agent, a colorant, a release agent, a thickener, and so forth to prepare a molding material (compound). The resin composition and the molding compound according to the invention can be handled in the same manner as for conventional unsaturated polyester resin compositions which are not prepared from PET. The molding compound of the invention exhibits excellent molding properties and stably provides molded articles with high quality and good appearance.

The unsaturated polyester resin composition according to the present invention is also useful as a matrix of fiber-reinforced plastics (FRP) comprising glass fiber (GF) as a main reinforcement. If desired, the resin composition can be mixed with a general unsaturated polyester resin composition or an air-drying unsaturated polyester resin composition to have improved properties or air-drying properties.

If desired, the unsaturated polyester resin composition can contain various additives commonly used in the production of liquid resin compositions, such as a curing agent, a cure accelerator, a polymerization inhibitor, a wax, a thixotropic agent, a reinforcement, a filler, a colorant, and the like.

The molding compound according to the present invention comprises the above-described unsaturated polyester resin composition as a main component and, in addition, a low profile additive, a reinforcement, a filler, a thickener, a curing agent, etc. and includes SMC and BMC. The molding compound can further contain other appropriately selected additives, such as a colorant, a release agent, a viscosity reducing agent, a silane coupling agent, a polymerization inhibitor, and the like.

The low profile additive which can be used in the molding compound includes, but is not limited to, thermoplastic polymers, such as polystyrene, polymethyl methacrylate, polyethylene, polypropylene, saturated polyester, and polyurethane. Three-dimensional crosslinked particles of these polymers are also useful. Suitable low profile additive can be selected according to the use or desired performance of the compound. Usually, polystyrene is frequently used for its water resistance and inexpensiveness. In the practice of unsaturated polyester resin molding materials, how to control the compatibility with polystyrene as a low profile additive is of significance. In this respect, the unsaturated polyester prepared by the process of the present invention exhibits satisfactory performance.

The reinforcement which can be used in the molding compound according to the present invention includes, but is not limited to, glass fiber, carbon fiber, aramid fiber, and mixed fiber thereof. Glass fiber is frequently used for its inexpensiveness.

The filler which can be used in the molding compound includes, but is not limited to, calcium carbonate, aluminum hydroxide, clay, talc, and silica. While a suitable filler is selected according to the use and desired performance of the molding compound, calcium carbonate is usually used for its excellent strength properties and inexpensiveness. The filler may be surface-treated.

The thickener which can be used in the molding compound includes, but is not limited to, polyvalent metal oxides, such as magnesium oxide and calcium oxide; and polyisocyanate compounds, such as crude diphenylmethane diisocyanate. While a suitable thickener can be selected according to the use and desired performance of the molding compound, magnesium oxide is generally used, with which the thickening degree can be controlled easily.

The curing agent which can be used typically includes organic peroxides, such as methyl ethyl ketone peroxide, t-butyl peroxyisopropyl carbonate, and t-butyl peroxybenzoate, and azo compounds, such as azobisisobutyronitrile. In particular, there are many organic peroxide curing agents, from which a suitable compound can be selected depending on the molding temperature and cycle determined based on the molded article productivity.

The colorant can be chosen from various organic or inorganic pigments, such as phthalocyanine compounds and titanium dioxide, and the like according to a desired hue. The pigment is generally added in the form of toner particles comprising an unsaturated polyester resin having the pigment uniformly dispersed therein.

The polymerization inhibitor to be used includes, but is not limited to, hydroquinone, toluhydroquinone, and p-benzoquinone. A suitable polymerization inhibitor is selected according to the molding properties of the molding compound.

The release agent which can be used include, but is not limited to, fatty acids, such as stearic acid and lauric acid, and metal salts thereof, such as zinc or calcium salts. A suitable release agent is selected according to the molding conditions.

Commercially available viscosity modifiers such as a viscosity reducing agent and commercially available silane coupling agents can be made use of.

The unsaturated polyester resin composition of the invention can also be mixed with an aggregate and a filler to provide resin concrete.

The present invention will now be illustrated in greater detail with reference to Examples, but it should be understood that the invention is not deemed to be limited thereto. Unless otherwise noted, all the parts and percents are given by weight.

EXAMPLE 1

Step (1)

In a 2-liter glass flask equipped with a thermometer, an inlet for nitrogen, a reflux condenser, and a stirrer were put 384 g (2.0 mol) of PET flakes obtained by mechanically grinding waste PET bottles, 208 g (2.0 mol) of neopentyl glycol, and 0.3 g of monobutyl stannate and heated in a nitrogen stream up to 230° C., at which the reaction mixture was maintained for about 3 hours. As temperature rose, PET gradually dissolved, and when the system became a slurry, stirring was started. After confirming the reaction system became transparent, the reaction mixture was cooled to 120° C., at which 392 g (4.0 mol) of maleic anhydride was added, and the temperature of the mixture was let to elevate up to 130° C. by making use of the heat generation of ring-opening reaction. At that temperature, 132 g (1.0 mol) of 95% DCPD was added thereto, followed by heating to 140° C., at which an addition reaction was carried out for about 4 hours. The designed acid value on completion of the addition reaction was 151 mgKOH/g. The found acid value after completion of the reaction was 155 mgKOH/g, from which the degree of addition was estimated at 95 mol % or more.

Step (2)

To the reaction mixture obtained in step (1) were charged 76 g (1.0 mol) of propylene glycol, 63 g (0.6 mol) of neopentyl glycol, and 0.1 g of hydroquinone and heated in a nitrogen stream up to 210° C. over about 3 hours. Polycondensation with dehydration was effected at that temperature. In about 6 hours, the acid value decreased to 27, whereupon the reaction mixture was cooled to 150° C. to give an unsaturated polyester (designated unsaturated polyester A).

Unsaturated polyester A was dissolved in 810 g of styrene (monomer) containing 0.4 g of hydroquinone to prepare resin solution A having a monomer content of 40%.

Eighty-five parts of resin solution A, 22.0 parts of a 65% solution of polystyrene (DICSTYRENE CR-3500, available from Dainippon Ink & Chemicals, Inc.; molecular weight: about 250,000) in styrene, 1.0 part of t-butylperoxyisopropyl carbonate (BIC-75, available from Kayaku Akzo Corp.) as a curing agent, 0.07 part of p-benzoquinone, 2.0 parts of polyethylene powder, 6.0 parts of zinc stearate, 140 parts of calcium carbonate, and 0.8 part of magnesium oxide were compounded by dispersive mixing to prepare a resin compound.

Glass fiber having a fiber length of 1 in. was impregnated with the resulting compound to prepare an SMC having a glass content of 30%. The SMC was protected with a polyethylene film on its both sides and wrapped for storage in an aluminum-deposited film impermeable to styrene. The resulting SMC was aged at 40° C. for 24 hours and stored at ambient temperature. After 3 days from the preparation, the SMC was pressed in a mold at 140° C. under 70 kgf/cm² to obtain a plate.

EXAMPLE 2

Step (1)

In the same flask as used in Example 1 were put 384 g (2.0 mol) of PET flakes obtained by mechanically grinding waste PET bottles, 180 g (2.0 mol) of 2-methyl-1,3-propanediol, and 0.3 g of monobutyl stannate and heated in a nitrogen stream up to 230° C., at which the reaction mixture was maintained for about 3 hours. As temperature rose, PET gradually dissolved, and when the system became a slurry, stirring was started. After confirming the reaction system became transparent, the reaction mixture was cooled to 120° C., at which 392 g (4.0 mol) of maleic anhydride was added. The temperature of the mixture was let to elevate up to 130° C. by making use of the heat generated by ring-opening reaction. At that temperature, 132 g (1.0 mol) of 95% DCPD was added thereto, followed by heating to 140° C., at which an addition reaction was carried out for about 4 hours. The designed acid value on completion of the addition reaction was 155 mgKOH/g. The found acid value after completion of the reaction was 159 mgKOH/g, from which the degree of addition was estimated at 95 mol % or more.

Step (2)

To the reaction mixture obtained in step (1) were charged 144 g (1.6 mol) of 2-methyl-1,3-propanediol and 0.1 g of hydroquinone and heated in a nitrogen stream up to 210° C. over a period of about 3 hours. Polycondensation with dehydration was effected at that temperature. In about 6 hours, the acid value decreased to 28, whereupon the reaction mixture was cooled to 150° C. to give an unsaturated polyester (designated unsaturated polyester B).

In the same manner as in Example 1, a resin solution (designated resin solution B), a resin compound, and an SMC (designated as SMC B) were prepared from the unsaturated polyester B, and a plate was molded from SMC B in the same manner as in Example 1.

EXAMPLE 3

Step (1)

In the same flask as used in Example 1 were put 384 g (2.0 mol) of PET flakes obtained by mechanically grinding waste PET bottles, 180 g (2.0 mol) of 2-methyl-1,3-propanediol, and 0.3 g of monobutyl stannate and heated in a nitrogen stream up to 230° C., at which the reaction mixture was maintained for about 3 hours. As temperature rose, PET gradually dissolved, and when the system became a slurry, stirring was started. After confirming the reaction system became transparent, the reaction mixture was cooled to 120° C., at which 392 g (4.0 mol) of maleic anhydride was added. The temperature of the mixture was let to elevate up to 130° C. by making use of the heat generated by ring-opening reaction. At that temperature, 132 g (1.0 mol) of 95% DCPD was added thereto, followed by heating to 140° C., at which an addition reaction was carried out for about 4 hours. The designed acid value on completion of the addition reaction was 155 mgKOH/g. The found acid value after completion of the reaction was 160 mgKOH/g, from which the degree of addition was estimated at 95 mol % or more.

Step (2)

To the reaction mixture obtained in step (1) were charged 166 g (1.6 mol) of neopentyl glycol and 0.1 g of hydroquinone and heated in a nitrogen stream up to 210° C. over a period of about 3 hours. Polycondensation with dehydration was effected at that temperature. In about 6 hours, the acid value decreased to 26, then the reaction mixture was cooled to 150° C. to give an unsaturated polyester (designated unsaturated polyester C).

In the same manner as in Example 1, a resin solution (designated resin solution C), a resin compound, and an SMC (designated as SMC C) were prepared from the unsaturated polyester C, and a plate was molded from SMC C in the same manner as in Example 1.

Comparative Example 1

In the same flask as used in Example 1 were put 384 g (2.0 mol) of PET flakes obtained by mechanically grinding waste PET bottles, 180 g (2.0 mol) of 2-methyl-1,3-propanediol, 92 g (1.2 mol) of propylene glycol, 104 g (1.0 mol) of neopentyl glycol, and 0.4 g of monobutyl stannate and heated in a nitrogen stream up to 220° C., at which the reaction mixture was maintained for about 3 hours. As temperature rose, PET gradually dissolved, and when the system became a slurry, stirring was started. After confirming the reaction system became transparent, the reaction mixture was cooled to 120° C., at which 392 g (4.0 mol) of maleic anhydride was added. The temperature of the mixture was let to rise up to 150° C. by making use of the heat generated by ring-opening reaction. Then, the temperature was elevated to 210° C. over about 3 hours by external heat application, at which temperature, polycondensation reaction was carried out while dehydrating. In about 7 hours, the acid value decreased to 28, then the reaction mixture was cooled to 150° C. to give a comparative (DCPD-unmodified) unsaturated polyester (designated unsaturated polyester D).

In the same manner as in Example 1, a resin solution (designated resin solution D), a resin compound, and an SMC (designated as SMC D) were prepared from the unsaturated polyester D, and a plate was molded from SMC D in the same manner as in Example 1.

Comparative Example 2

In the same flask as used in Example 1 were put 384 g (2.0 mol) of PET flakes obtained by mechanically grinding waste PET bottles, 320 g (4.2 mol) of propylene glycol, and 0.4 g of monobutyl stannate and heated in a nitrogen stream up to 210° C., at which the reaction mixture was maintained for about 4 hours. As temperature rose, PET gradually dissolved, and when the system became a slurry, stirring was started. After confirming the reaction system became transparent, the reaction mixture was cooled to 120° C., at which 392 g (4.0 mol) of maleic anhydride was added. The temperature of the mixture was let t-o rise up to 150° C. by making use of the heat generated by ring-opening reaction. Then, the temperature was elevated to 210° C. over about 3 hours by external heat application, at which temperature, polycondensation reaction was carried out while dehydrating. In about 8 hours, the acid value decreased to 29, whereupon the reaction mixture was cooled to 150° C. to give a comparative (DCPD-unmodified) unsaturated polyester (designated unsaturated polyester E).

In the same manner as in Example 1, a resin solution (designated resin solution E), a resin compound, and an SMC (designated as SMC E) were prepared from the unsaturated polyester E, and a plate was molded from SMC E in the same manner as in Example 1.

The molded plates obtained in Examples 1 to 3 and Comparative Examples 1 and 2 were evaluated for the appearance with the naked eye and a glossimeter (supplied by Murakami Shikisai Gijutsu Kenkyusyo). An overall judgement on appearance was made on an A-to-D scale according to the following criteria. The results obtained are shown in Table 1 below together with the compounding formulation of SMC. Criteria for overall judgement:

A . . . Having a gloss of 80 or higher and free from nevenness of gloss, pin holes, and thin-spots.

B . . . Having a gloss of 80 or higher, free from pinholes and thin-spots, and having slight unevenness of gloss.

C . . . Having a gloss of 70 or more and showing moderate pin holes or thin-spots.

D . . . Having a gloss of less than 70 and suffering from heavy unevenness of gloss and many pinholes and thin-spots.

TABLE 1

|  | Example | | | Comparative Example | |
| --- | --- | --- | --- | --- | --- |
|  | 1 | 2 | 3 | 1 | 2 |
| SMC Compounding Formulation (part by weight) | A | B | C | D | E |
| Resin solution A | 85 | — | — | — | — |
| Resin solution B | — | 85 | — | — | — |
| Resin solution C | — | — | 85 | — | — |
| Resin solution D | — | — | — | 85 | — |
| Resin solution E | — | — | — | — | 85 |
| Polystyrene solution | 22 | 22 | 22 | 22 | 22 |
| p-Benzoquinone | 0.07 | 0.07 | 0.07 | 0.07 | 0.07 |
| BIC-75* | 1.00 | 1.00 | 1.00 | 1.00 | 1.00 |
| Polyethylene powder | 2.00 | 2.00 | 2.00 | 2.00 | 2.00 |
| Zinc stearate | 6.00 | 6.00 | 6.00 | 6.00 | 6.00 |
| Magnesium oxide | 0.80 | 0.80 | 0.80 | 0.80 | 0.80 |
| Calcium carbonate | 140 | 140 | 140 | 140 | 140 |
| Glass fiber (%) | 30 | 30 | 30 | 30 | 30 |
| 60° Glass | 89 | 90 | 90 | 70–80 | 50–60 |
| Gloss unevenness | slight | no | no | moderate | heavy |
| Surface pinholes | no | no | no | moderate | many |
| Thin-spots | no | no | no | moderate | many |
| Overall judgement on appearance | B | A | A | C | D |

*t-Butylperoxyisopropyl carbonate

The results of Table 1 prove that the molding compound mainly comprising the resin prepared by the process of the present invention provides a molded article with excellent appearance and stable quality.

EXAMPLE 4

Scale-up Production of Unsaturated Polyester Resin Solution

Step (1)

In a 2000-liter stainless steel reactor equipped with a thermometer, an inlet for nitrogen, a reflux condenser, and a stirrer were put 500 kg of PET flakes obtained by mechanically grinding waste PET bottles, 235 kg of 2-methyl-1,3-propanediol, and 0.37 kg of monobutyl stannate and heated in a nitrogen stream up to 230° C., at which the reaction mixture was maintained for about 3 hours. As temperature rose, PET gradually dissolved, and when the system became a slurry, stirring was started. After confirming the reaction system became transparent, the reaction mixture was cooled to 120° C., at which 510 kg of maleic anhydride was added, and the temperature of the mixture was let to elevate up to 130° C. by making use of the heat generated by ring-opening reaction. At that temperature, 172 kg of 95% DCPD was added thereto, followed by heating to 140° C., at which an addition reaction was carried out for about 4 hours. The designed acid value on completion of the addition reaction was 155 mgKOH/g. The found acid value after completion of the reaction was 158 mgKOH/g, from which the degree of addition was estimated at 95 mol % or more.

Step (2)

To the reactor containing the reaction mixture obtained in step (1) were charged 180 kg of 2-methyl-1,3-propanediol and 0.13 kg of hydroquinone and heated in a nitrogen stream up to 210° C. over about 3 hours. Polycondensation with dehydration was effected at that temperature. In about 6 hours, the acid value decreased to 27, whereupon the reaction mixture was cooled to 150° C. to give an unsaturated polyester (designated unsaturated polyester F).

Unsaturated polyester F was dissolved in 820 kg of styrene (monomer), and 0.5 kg of hydroquinone was added to prepare resin solution F having a monomer content of 40%.

The resulting unsaturated polyester F and the unsaturated polyester B obtained in Example 2 were closely compared through NMR analysis, gel-permeation chromatography, and the like. As a result, it was verified that they have practically the same chemical structure. Comparisons between Examples 2 and 4 in terms of curing characteristics of the resin solutions, the characteristics of the molding compounds, and the physical properties of the molded articles also revealed substantial equality, proving the process of the invention to be suitable to large-volume production.

The unsaturated polyester resins prepared from PET according to the present invention exhibit marked improvements over those obtained from PET by conventional techniques. That is, the resin of the invention has improved compatibility with a low profile additive to provide molded articles with high quality and good appearance. The present invention has a high social value from the standpoint of resources recycling. In the practice, the process of the invention copes with large-volume production of molded articles with good appearance which have been difficult to secure with conventional PET-based unsaturated polyester resin designing.

What is claimed is:

1. A process for producing an unsaturated polyester comprising the steps of (1) (A) depolymerizing polyethylene terephthalate with a polyhydric alcohol, (B) adding maleic anhydride to the depolymerization product to allow them to react with each other, and (C) adding dicyclopentadiene to a carboxyl group derived from the maleic anhydride to cause an addition reaction yielding a reaction product having an acid value of 100 mg KOH/g or more; and (2) adding a polyhydric alcohol or a polyhydric alcohol and a polybasic acid to the reaction product obtained in step (1) to cause a polycondensation reaction.

2. The process according to claim 1, wherein the molar ratio of dicyclopentadiene in step (C) to maleic anhydride in step (B) is from 0.15:1 to 0.5:1.

3. The process according to claim 1, wherein an acid value of the reaction product obtained in step (1) is measured so as to control the addition rate of the dicylopentadiene to the carboxyl group derived from the maleic anhydride.

4. The process according to claim 1, wherein said maleic anhydride is added in an amount of 40 to 100% by weight based on the polyethylene terephthalate depolymerization product.

5. The process according to claim 1, wherein said dicyclopentadiene is added in an amount of 20 to 50% by weight based on the polyethylene terephthalate depolymerization product.

* * * * *